UNITED STATES PATENT OFFICE.

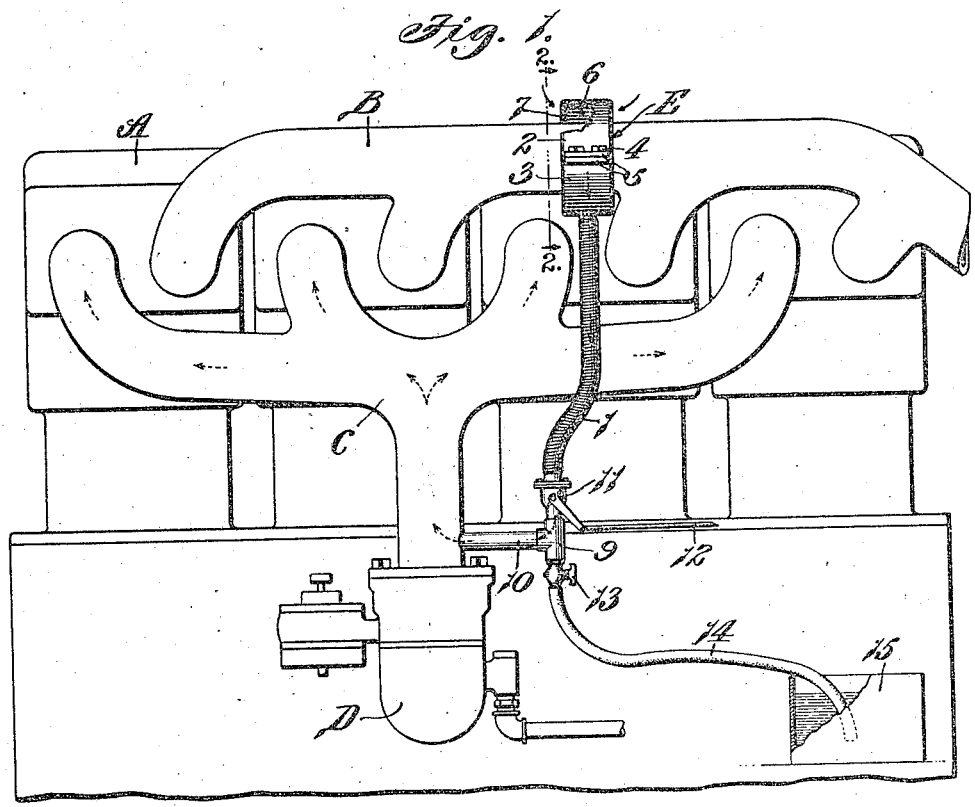
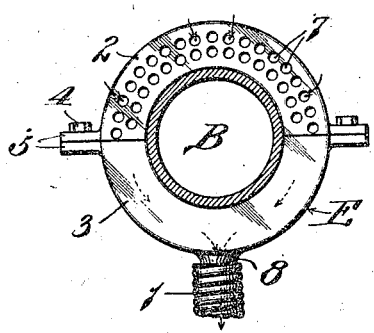
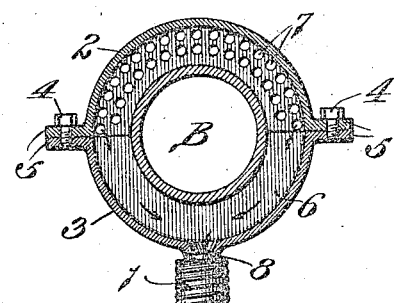

EDWARD D. STRANGE, OF EAST ST. LOUIS, ILLINOIS, AND MARTIN M. HEFFREAN, OF ST. LOUIS, MISSOURI.

AIR-HEATING DEVICE FOR INTERNAL-COMBUSTION ENGINES.

1,143,831.  Specification of Letters Patent.  Patented June 15, 1915.

Application filed January 12, 1914. Serial No. 811,638.

*To all whom it may concern:*

Be it known that we, EDWARD D. STRANGE and MARTIN M. HEFFREAN, both citizens of the United States, residing at East St. Louis, Illinois, and St. Louis, Missouri, respectively, have invented a certain new and useful Improvement in Air-Heating Devices for Internal-Combustion Engines, of which the following is a full, clear, and exact description, such as will enable others skilled in the art to which it appertains to make and use the same.

This invention relates to air heating devices for internal combustion engines, and has for its main object to provide a device of the character described that is constructed in such a manner that more power is produced in an engine equipped with the same with a given amount of fuel than in the engines heretofore in use.

We have discovered that by adding pre-heated fresh air to the combustible mixture produced by the carbureter of an internal combustion engine, the efficiency of the engine is greatly increased, and to this end we have provided novel means for heating fresh air and thereafter mixing the same with the charge that has been formed in the carbureter.

Figure 1 of the drawings is a side elevational view, partly in section, of an air-heating device constructed in accordance with our invention, showing the same applied to an internal combustion engine; Fig. 2 is a vertical sectional view taken on the line 2—2 of Fig. 1; and Fig. 3 is a vertical sectional view of the air-heating device shown in Fig. 2.

Referring to the drawings which illustrate the preferred form of our invention, A designates an internal combustion engine provided with an exhaust manifold B and an intake manifold C, said intake manifold being provided at its lower end with a carbureter D of any suitable construction or design.

As is well-known to those skilled in the art, in the ordinary internal combustion engine of the type illustrated, fuel and air are introduced into the carbureter, there mixed, and this combustible mixture is drawn upward through the intake manifold by the suction created in the cylinders of the engine. We have found that pre-heated fresh air added to this combustible mixture greatly increases the efficiency of the engine, and to accomplish this in a convenient and simple manner we provide means whereby fresh air is heated by contact with the hot exhaust manifold and thereafter introduced into the intake manifold at a point above the carbureter. In the embodiment of our invention herein shown this means consists of a housing or hollow casing E that is clamped tightly around the exhaust manifold B of the engine and a flexible conduit 1 which connects said casing to the intake manifold C.

The casing E is preferably composed of an upper and lower section 2 and 3, respectively, that are placed about the exhaust manifold and held in operative relationship therewith by means of clamping screws 4 that coöperate with laterally projecting flanges 5 arranged on said sections. Each of the sections 2 and 3 is approximately U-shape in cross section and when assembled, as shown, form an annular chamber 6 that surrounds the exhaust manifold B. The upper section 2 is provided with a plurality of perforations 7 by means of which air is admitted to the chamber 6, and the lower section 3 is provided with a hollow extension 8 to which the upper end of the flexible conduit 1 is attached, the lower end of said conduit being connected to a T 9 whose lateral branch is connected to the intake manifold C by means of a short pipe or nipple 10. The conduit 1 is provided with a valve 11, preferably of the butterfly type, that is adapted to be operated by a rod 12 that extends to a point within convenient reach of the operator of the engine, and by means of which the amount of air that passes through said conduit to the intake manifold may be varied as desired.

In operation, the engine is started by means of the mixture produced by the carbureter D, and after running a short time so as to cause the exhaust manifold B to become heated, the valve 11 is opened by the operator of the engine and the suction created in the cylinders of the engine causes fresh atmospheric air to be drawn into the chamber C through the perforations 7, where it comes into intimate contact with the hot walls of the exhaust manifold B and is thereafter drawn down through the conduit 1 and into the intake manifold C, where it mingles with the charge that is drawn up through the carbureter D and thus produces a mixture in the intake manifold that greatly increases the efficiency of the engine.

Another very desirable feature of our invention is that it can be utilized to greatly facilitate the cleaning of the cylinders of the engine; or, in other words, be of great assistance in removing the carbon deposits that collect on the inner walls of the cylinders. The method heretofore in use for accomplishing this consists in alternately introducing the cleaning liquid, such as raw kerosene, into some of the cylinders of a multiple cylinder engine and running the engine on the other cylinders while the cleaning liquid is agitated by the pistons and gradually dissolves the carbon deposits. The usual method of introducing the liquid is to remove the spark plugs of the desired cylinders and pour the liquid through the exposed openings. This method is troublesome and takes a great deal of time, and consequently many engines are neglected and their efficiency reduced because of the accumulation of carbon on the inner walls of the cylinders.

We have found that by introducing the cleaning liquid, such as kerosene, directly into the intake manifold and mixing the same with the pre-heated fresh air that is generated in the casing E, that a volatile combustible mixture is formed which will operate the engine independently of the carbureter D and at the same time remove or dissolve all carbon or other foreign deposits that have formed on the inner walls of the cylinders. To accomplish this in a simple and convenient manner we provide a valve or pet-cock 13 in the lower opening of the T 9 to which is attached a suitable conduit 14 that communicates with a source of supply 15 of kerosene or other similar cleaning liquid; the suction produced in the cylinders acting to draw the liquid into the intake manifold.

From the foregoing description it will be seen that we have devised an engine which comprises a simple and cheap means whereby the charges of fuel that enter the cylinders of the engine are rendered more efficient, and whereby the cylinders of an engine may be easily and quickly cleared of deposits of foreign matter that accumulate therein.

While we have herein shown our invention as applied to a four-cylinder, four-cycle internal combustion engine of the L-head type, that is, one in which both the exhaust and intake manifolds are arranged on the same side of the engine, it is immaterial, so far as our broad idea is concerned, to what particular type of engine our invention is applied, and it is also understood that many minor changes may be made in the construction and arrangement of the parts constituting our invention without departing from the spirit thereof.

Having thus described our invention, what we claim as new and desire to secure by Letters Patent is:

1. A device of the character described comprising a hollow member that is divided horizontally into two sections, the upper section being provided with a plurality of perforations and the lower section being provided with an extension for conveying the heated air.

2. An air heating device for internal combustion engines comprising an upper and a lower semi-circular housing that are U-shaped in cross section and which are adapted to be clamped to the exhaust pipe so as to form an annular chamber therearound, means on the upper housing for admitting fresh air to said chamber, and conveying means on said lower housing.

3. In a device of the character described, an exhaust pipe, and an air-collecting chamber that surrounds said pipe and which comprises an annular U-shaped housing that is divided on a horizontal line so as to form two semi-circular portions, the upper one of said portions being provided with a plurality of perforations, and the lower one of said portions being provided with a flexible conduit.

4. An air-heating device comprising a ring-shaped casing that is approximately U-shaped in cross section and which provides a chamber that is adapted to completely surround the exhaust pipe of an internal combustion engine, the outer wall of said exhaust pipe forming the inner wall of said chamber, said casing being split horizontally so as to form a plurality of sections, the upper one of said sections having means for admitting fresh air to said chamber, and the lower one of said sections having means for transmitting said air.

5. An air-heating device for internal combustion engines comprising a semi-circular member that is U-shaped in cross section and which is provided at its lower portion with laterally extending perforated lugs and in its side walls with a plurality of air-receiving openings, a coöperating semi-circular member that is U-shaped in cross section and which is provided at its upper portion with laterally extending lugs that cooperate with said first-mentioned lugs, said last-named member having imperforate side walls and an air-conveying conduit leading from the lower portion thereof, and means for securing said lugs together so as to clamp the complete device around the exhaust manifold of the engine.

In testimony whereof, we hereunto affix our signatures, in the presence of two witnesses, this ninth day of January, 1914.

EDWARD D. STRANGE.
MARTIN M. HEFFREAN.

Witnesses:
GEORGE BAKEWELL,
GEORGE R. LADSON.